(12) United States Patent
Monroe

(10) Patent No.: US 6,366,311 B1
(45) Date of Patent: *Apr. 2, 2002

(54) RECORD AND PLAYBACK SYSTEM FOR AIRCRAFT

(76) Inventor: David A. Monroe, 740 Lincoln Center, 7800 IH West, San Antonio, TX (US) 78230

( * ) Notice: Subject to any disclaimer, the term of this patent is extended or adjusted under 35 U.S.C. 154(b) by 0 days.

This patent is subject to a terminal disclaimer.

(21) Appl. No.: 09/257,765

(22) Filed: Feb. 25, 1999

Related U.S. Application Data

(63) Continuation-in-part of application No. 08/729,139, filed on Oct. 11, 1996, now abandoned.

(51) Int. Cl.$^7$ ................................................. H04N 7/18
(52) U.S. Cl. ...................................... 348/148; 348/159
(58) Field of Search ................................. 348/143, 144, 348/151, 152, 153, 154, 156, 159; 701/14, 29, 35; 340/439, 963; H04N 7/18

(56) References Cited

U.S. PATENT DOCUMENTS

| | | | | |
|---|---|---|---|---|
| 3,256,386 A | * | 6/1966 | Morchand ..................... 348/485 |
| 4,831,438 A | * | 5/1989 | Bellman, Jr. et al. ........ 348/153 |
| 5,166,789 A | * | 11/1992 | Myrick ........................ 348/144 |
| 5,191,412 A | * | 3/1993 | Thomson ..................... 348/143 |
| 5,283,643 A | * | 2/1994 | Fujimoto ..................... 348/143 |
| 5,596,494 A | * | 1/1997 | Kuo ............................ 348/144 |
| 5,604,534 A | * | 2/1997 | Hedges et al. .............. 348/144 |
| 5,625,409 A | * | 4/1997 | Rosier et al. ............... 348/144 |

* cited by examiner

Primary Examiner—Nhon T Diep
(74) Attorney, Agent, or Firm—Bracewell & Patterson, L.L.P.

(57) ABSTRACT

Multiple data and images are multiplexed and sequenced utilizing split screen technology in order to minimize the recording and monitoring hardware required to process the images, providing a detailed record of the time of an event, the altitude and geographic location of the aircraft and the type and location of the event within the aircraft, greatly enhancing event reconstruction efforts. The multi-media safety and surveillance system for aircraft incorporates a plurality of strategically spaced sensors including video imaging generators for monitoring critical components and critical areas of both the interior and the exterior of the aircraft. The captured data and images are recorded and may be transmitted to ground control stations for real time or near real time surveillance. The system is tied directly into the global positioning system of the aircraft so that the precise location of the aircraft may be determined when an event occurs.

15 Claims, 15 Drawing Sheets

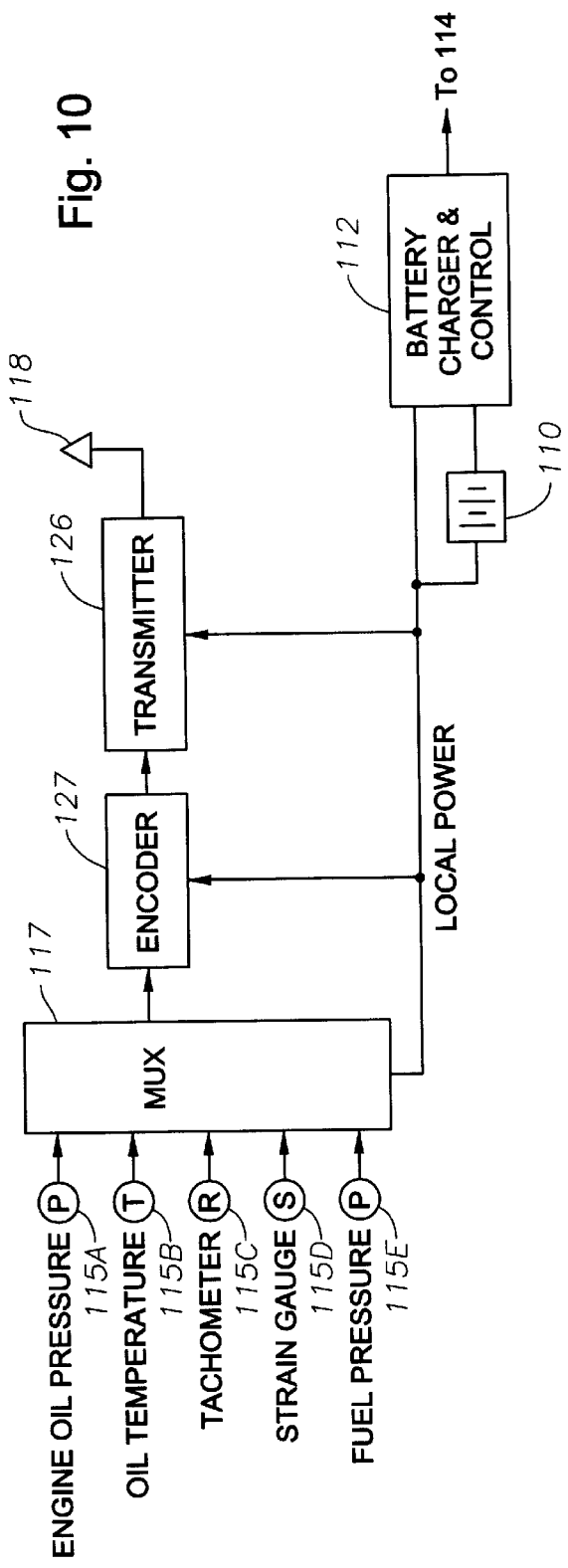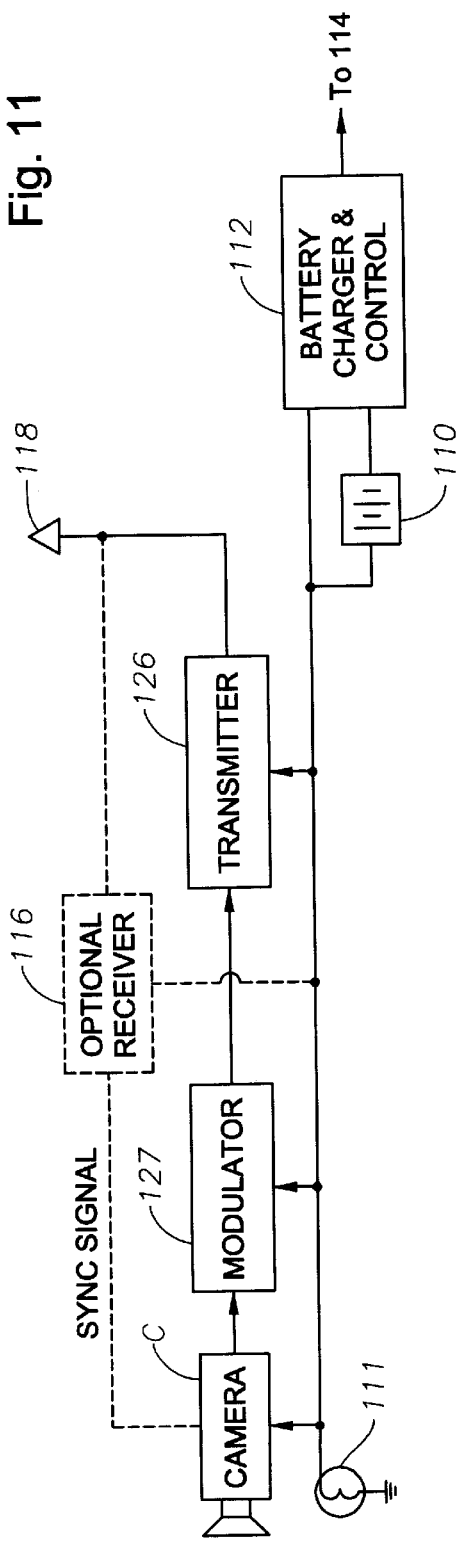

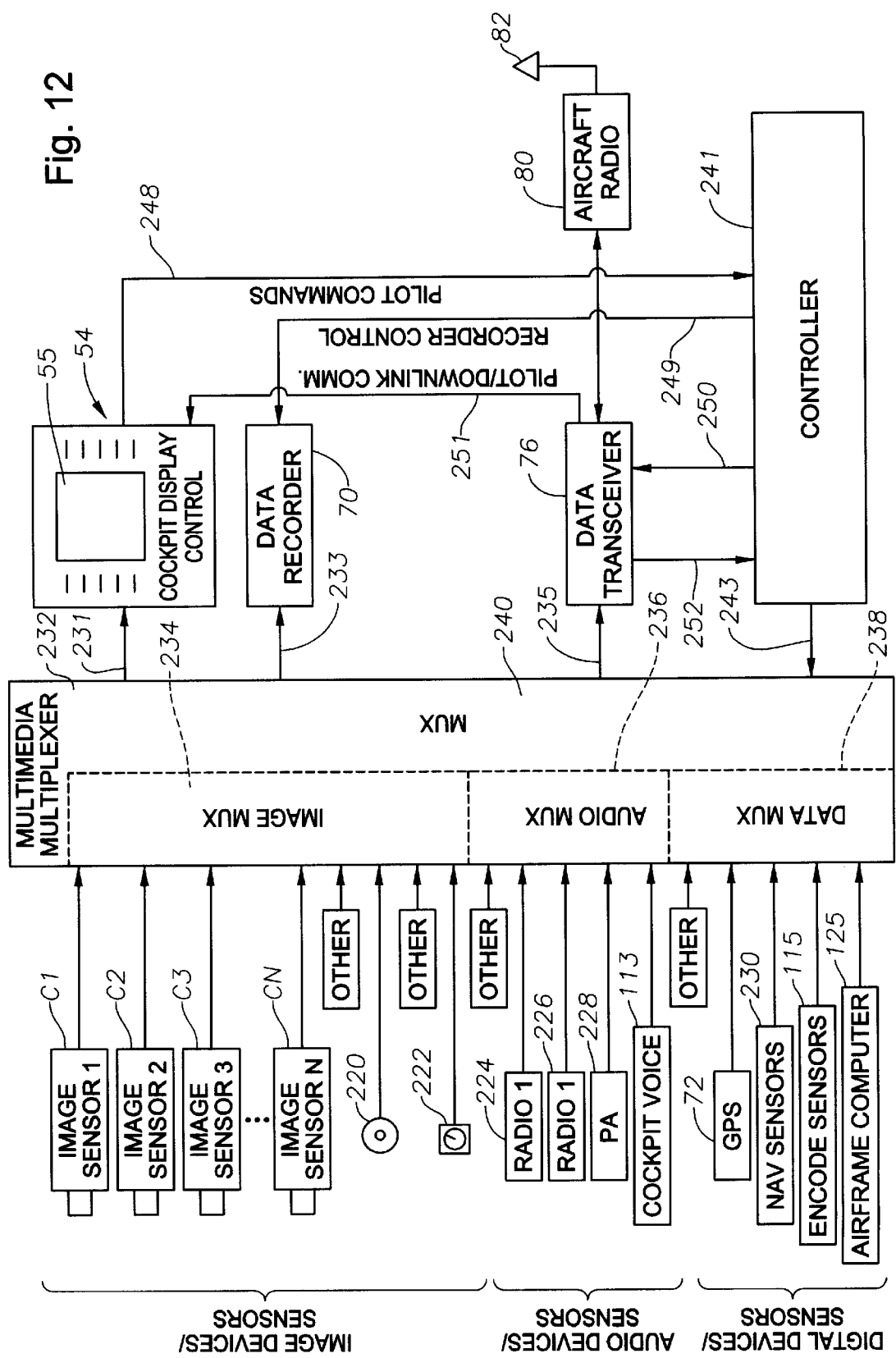

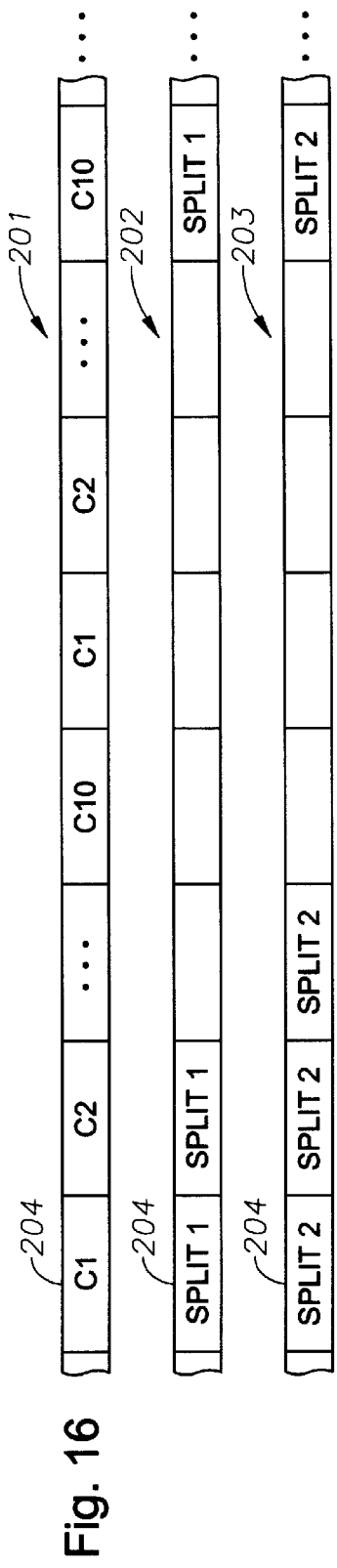
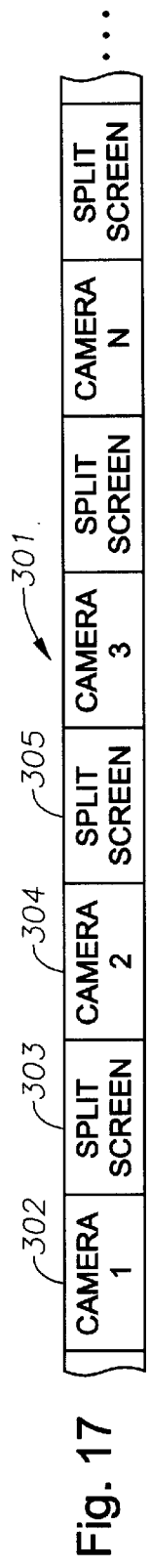
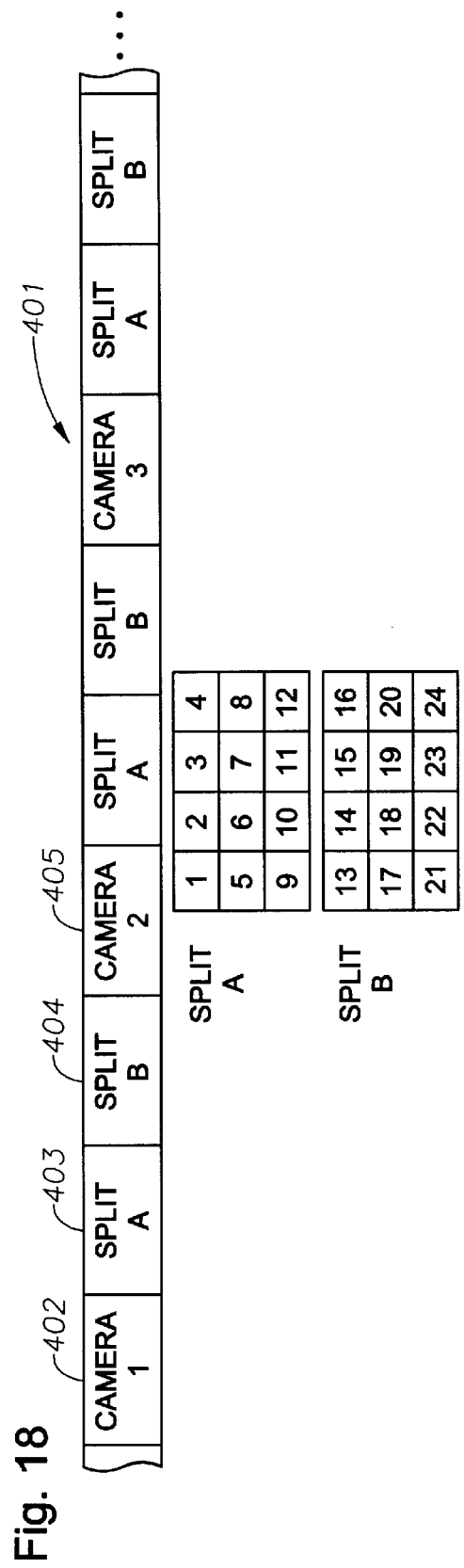
Fig. 16
Fig. 17
Fig. 18

RECORD AND PLAYBACK SYSTEM FOR AIRCRAFT

CROSS REFERENCE TO RELATED APPLICATION

This application is continuation-in-part of my copending application, Ser. No. 08/729,139, entitled: "VIDEO AND DATA RECAPTURE AND RETRIEVAL SYSTEM FOR AIRCRAFT," filed on Oct. 11, 1996, now abandoned.

BACKGROUND OF INVENTION

1. Field of Invention

The subject invention is generally related to safety and surveillance equipment for aircraft and is specifically directed to a comprehensive multi-media recording and playback system for commercial aircraft wherein both data and video images may be collected, monitored, transmitted, stored and replayed for event reconstruction.

2. Discussion of the Prior Art

Aircraft safety is of ever increasing importance. This is particularly true with respect to commercial airlines as more and more people and freight are moved in this manner. The airways are becoming increasingly crowded with traffic. Global tracking systems are now in place to monitor the flight of the aircraft from the moment it lifts off until it safely lands at its destination. Radar and global positioning systems are commonplace both on the aircraft and at the ground tracking stations. All of these electronic systems have increased the overall safety record of commercial traffic to new standards as the number of miles flown continues to escalate at an alarming pace.

In addition, the on board avionics including electronic monitoring and diagnostic equipment, particularly on large commercial jets, continues to evolve, giving both the on board crew and the tracking station more complete, accurate and up to date information regarding the condition of the aircraft while in flight. Flight recorders long have been incorporated in order to provide a record of each flight and in order to provide critical information to aid in the determination of the causes of an accident or malfunction should one occur.

Even with all of this information, there still remains a significant need to develop a system capable of providing good visual evidence of the condition of the aircraft and various components during flight. For example, even with all of the available electronic monitoring equipment, the crew of the aircraft can only make a visual inspection of a wing engine by looking out of the window. In many aircraft configurations, this requires that the crew member move into the passenger cabin in order to obtain a view of the engine. Further, with the increasing incidents of terrorism and other tampering with aircraft, a good visual surveillance system would give instant recognition of known terrorists and would provide visual inspection of critical areas and components of the aircraft while in flight, without detection by either the passengers or by possible perpetrators.

Such a system would also permit the recording of visual information to provide a visual history of the flight, further enhancing reconstruction of incidents leading to an airborne catastrophe should one occur. Visual information could also be transmitted between the ground tracking station and the aircraft, providing yet another source of information transmission for increasing the overall safety of the flight.

While such a system would be of great benefit to the airline industry in general and to the commercial airlines in particular, there are no systems currently available which meet these needs.

SUMMARY OF THE INVENTION

The subject invention is directed to a recording and playback system wherein multiple data and images are multiplexed and sequenced utilizing split screen technology in order to minimize the recording and monitoring hardware required to process the images in order to provide a detailed record of the time of an event, the altitude and geographic location of the aircraft and the type and location of the event within the aircraft, greatly enhancing event reconstruction efforts. The system is a comprehensive multi-media safety and surveillance system, which in the preferred form provides both visual and audio information as well as critical data to the flight crew, and to a ground tracking station, and also permits recording the information and data generated during flight for archival purposes and for later playback, particularly useful in reconstructing catastrophic events. In its preferred form, a plurality of sensor units, including at least one video image sensor/device, are placed strategically throughout the aircraft. For example, several video cameras may be placed such that the lens of each is aimed through an opening provided in the fuselage in order to provide video imaging of the engines, tail section, and landing gear and other functional components of the aircraft. Additional cameras may be placed throughout the interior of the aircraft on the flight deck, in the cargo hold, in passenger cabin and other desired spaces. The data sensors/transducers, such as by way of example, the engine temperature sensor, oil pressure and hydraulic pressure sensors and strain gauges and the like are also incorporated in the data collection system of the subject invention.

The system may be hardwired in the aircraft, or may use wireless transmission and receiving systems. The wireless system is particularly useful for adapting the system as a retrofit on existing aircraft and also provides assurances against disruption of data transmission and collection during a catastrophic airframe failure. In the preferred embodiment, the wireless system is fully self-contained with each sensor unit having an independent power supply and where appropriate, a sensor light source. The ground link, monitoring and recording systems for collecting and transmitting the data are also self-contained. This assures that the system will continue to operate in the event of either a malfunction or a structural failure of the aircraft causing a disruption in power source or will not disrupt the generation and collection of data and visual images.

A monitor may be provided on the flight deck and recorders may be placed in the tail section, as is common for flight data and voice recorders currently in use. The flight deck would have instant live access to all of the images as they are captured by the video cameras and the recorder would make an historic record of the images for archive purposes. Where random access recording techniques are used, such as, by way of example, digital random access memory storage devices, the flight deck and for the ground station may also be able to search and retrieve stored information. For example, current hydraulic pressure of a component may be compared with the pressure of a past point in time to monitor rate of change.

Where desired, ground tracking or control stations would have selective access to the images on a near or real time basis. In addition, the ground station could send video images to the aircraft flight deck monitors on a selective basis. That is, the ground tracking station will have the capability of interrogating the in flight data, including video images, while the aircraft is in flight. Near real time data can be received and historical data can be retrieved, as well, when the random access storage device is utilized.

The plurality of sensors are synchronized through an on board multiplexing system whereby the plurality of data, including visual image data, may be displayed, recorded, and/or transmitted in either a split screen or serial fashion. In the preferred embodiment, the system is adapted for incorporating the data signal generated by the aircraft navigational data such as that provided by the on board global positioning system for tracking the altitude, latitude and longitude coordinates synchronized with the collected data in order to provide accurate information of where the aircraft is in its flight plan when an incident occurs. A time or chronology signal may also be incorporated in the data scheme. Any signal which is capable of being captured and stored may be monitored in this manner. For example, radar images which are currently displayed on a monitor can also be transmitted to the ground and can be stored in the record of the A black box recording system on board the aircraft. Transducer signals monitoring pressure system and engine components are also be collected for transmission and storage. Data generated by image sensors ranging from analog video cameras to digital cameras to infrared sensors and the like can collected and distributed by the system. The system is particularly well suited for use in combination with forward linking infrared (FLIR) cameras, such as available from Texas Instruments, for producing visual images in adverse weather conditions such as heavy fog. This would be particularly useful in determining the flight path of the aircraft, both on board and for later retrieval when incidents occur in low visibility conditions. Therefore, the system of the subject invention provides a comprehensive multi-media data capture, display, transmission and storage surveillance system for the aircraft while in flight, with data readily accessible to both the flight crew and a ground tracking station.

Preferably, the entire capture, retrieval, monitor and archive system is installed utilizing a wireless transmitting/ receiving system in order to assure that transmission will not be lost in the event of a power shutdown or a structural failure causing possible open circuit conditions which could occur in a hard wired system. In the preferred embodiment, such a system would be completely self-contained with an integrated power supply and an integrated illumination system. The illumination system would provide lighting to permit capture of images in the event the aircraft power system fails.

Such a system would be of invaluable service to the flight crew and the ground tracking station, providing visual indication of such information as the operation of the landing gear, for example, or of an engine smoke condition, or of the presence of smoke or fire in the cargo hold. In addition, the system provides instant visual access to conditions in the passenger cabin or in the cargo hold. In addition, the ground station could relay video information directly to the crew in the event of certain conditions. For example, if a terrorist or terrorist group were on board, the ground crew would have access to visual information indicating the conditions in the passenger cabin and cockpit. This would permit the ground crew to ascertain the number of terrorists on board, the types of weapons carried and visual identification of the individuals without any communication from the flight crew and without any flight crew action. Such information is invaluable in determining the best course of action for dealing with such a crisis. Further, critical visual information can be transmitted to the flight crew for assisting the crew in dealing with the situation.

Of course, it is an important aspect of the invention that all of the collected data, including any video images, be recorded on a flight recorder to provide an historic video record of the flight. This will prove invaluable as an aid in reconstructing the cause of catastrophic occurrences during a flight.

In the preferred embodiment, the system includes a plurality of strategically located video image sensors such as, by way of example, analog video cameras synchronized by a master synchronizing source, each camera adapted for transmitting the synchronized video signal to a multiplexer for distributing the signal to video monitors on board the aircraft and archival recorders on board the aircraft. The system also includes audio sensors and component monitoring sensor devices. The system is adapted for selectively transmitting all of the data on a near real time basis to a ground tracking station. The system is adapted to provide the monitors access to serial, synchronized full screen view of each of the cameras, in sequence, or alternatively to provide split screen viewing of a plurality of cameras. The system may be hardwired or wireless transmission may be utilized to further minimize the possibility of a malfunction at the onset of a catastrophic occurrence.

It is, therefore, an object and feature of the subject invention to provide a comprehensive, multi-media data collection, storage and playback system for aircraft.

It is an additional object and feature of the subject invention to provide a video record of critical components and areas of an aircraft during flight for archival and retrieval purposes.

It is yet another object and feature of the subject invention to provide apparatus for permitting ground personnel to receive video images, audio information and data relating to critical components and areas of and aircraft during flight.

It is a further object and feature of the subject invention to provide accurate information of where the aircraft is during a flight path when a specific visually captured image occurs.

It is also an object and feature of the subject invention to provide a system for linking recorded video images with an inertial navigation system such or other navigational data source such as, by way of example, a global positioning system for archival purposes.

It is still another object and feature of the invention to permit the monitoring, storing and retrieval of any of a variety of video images, audio signals and performance data by the tracking, surveillance and imaging equipment on board the aircraft.

Other objects and features of the subject invention will be readily apparent from the accompanying drawings and detailed description of the preferred embodiments.

BRIEF DESCRIPTION OF THE DRAWINGS

FIG. 10 is an expansion of the system of FIG. 10, illustrating an exemplary engine telemetry sensor array.

FIG. 11 is an expanded diagram of wireless telemetry incorporating image sensors.

FIG. 12 is illustrative of a comprehensive multimedia system in accordance with the teachings of the subject invention.

FIG. 16 shows a timing diagram for a three channel multiplexed system using a split screen format.

FIG. 17 is a timing diagram for a time multiplexed recording configuration for a single channel system using a split screen format FIG. 18 is a timing diagram for an alternative time multiplexed recording configuration utilizing split screen technology.

DETAILED DESCRIPTION OF THE PREFERRED EMBODIMENTS

Figure 1:
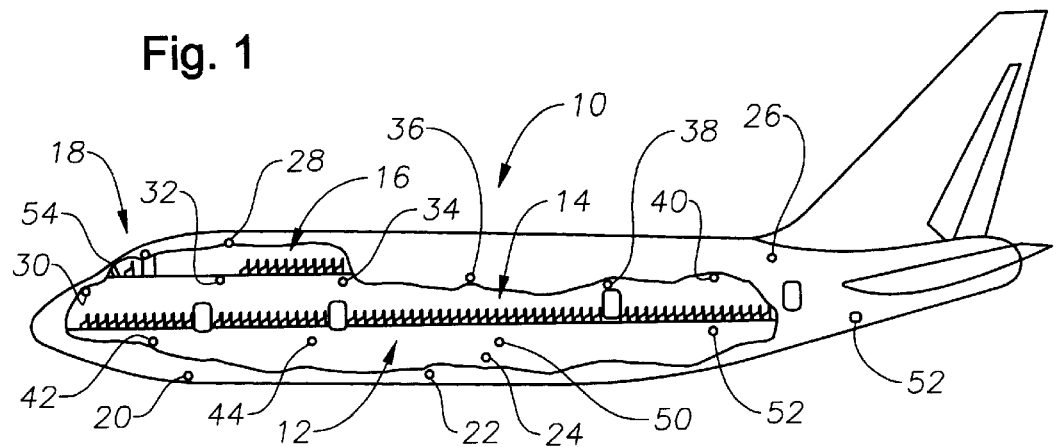
FIG. 1 is a cutaway illustration of the fuselage of an aircraft showing placement of video imaging devices in accordance with the invention.

FIG. 1 shows a cutaway diagram of a typical commercial airline fuselage 10, with the cargo hold 12, the passenger cabins 14, 16 and the flight deck or cockpit 18 partially visible. In the example, a number of video image sensor devices such as, by way of example, analog video cameras, may be mounted inside the skin of the aircraft and aimed through openings provided in the fuselage to focus on critical components of the aircraft, such as the landing gear cameras 20,22, the wing engine camera 24 and the tail camera 26. Similar devices or cameras may also be strategically placed throughout the interior of the aircraft, such as the passenger cabin cameras 28,30,32,34,36, 38, 40, the cargo bay cameras 42, 44, 46, 48 and the flight deck camera 50. The placement and number of devices is a matter of choice depending upon the configuration of the aircraft and the level of surveillance desired.

In the embodiment shown and described, a multi-media flight recorder or "black box" 52 is stowed in the tail section of the aircraft, in the same manner as the current data and voice black boxes (not shown). A flight deck monitor and control panel 54 is located on the control panel in the cockpit 18. Other monitors may be provided where desired.

Figure 2:
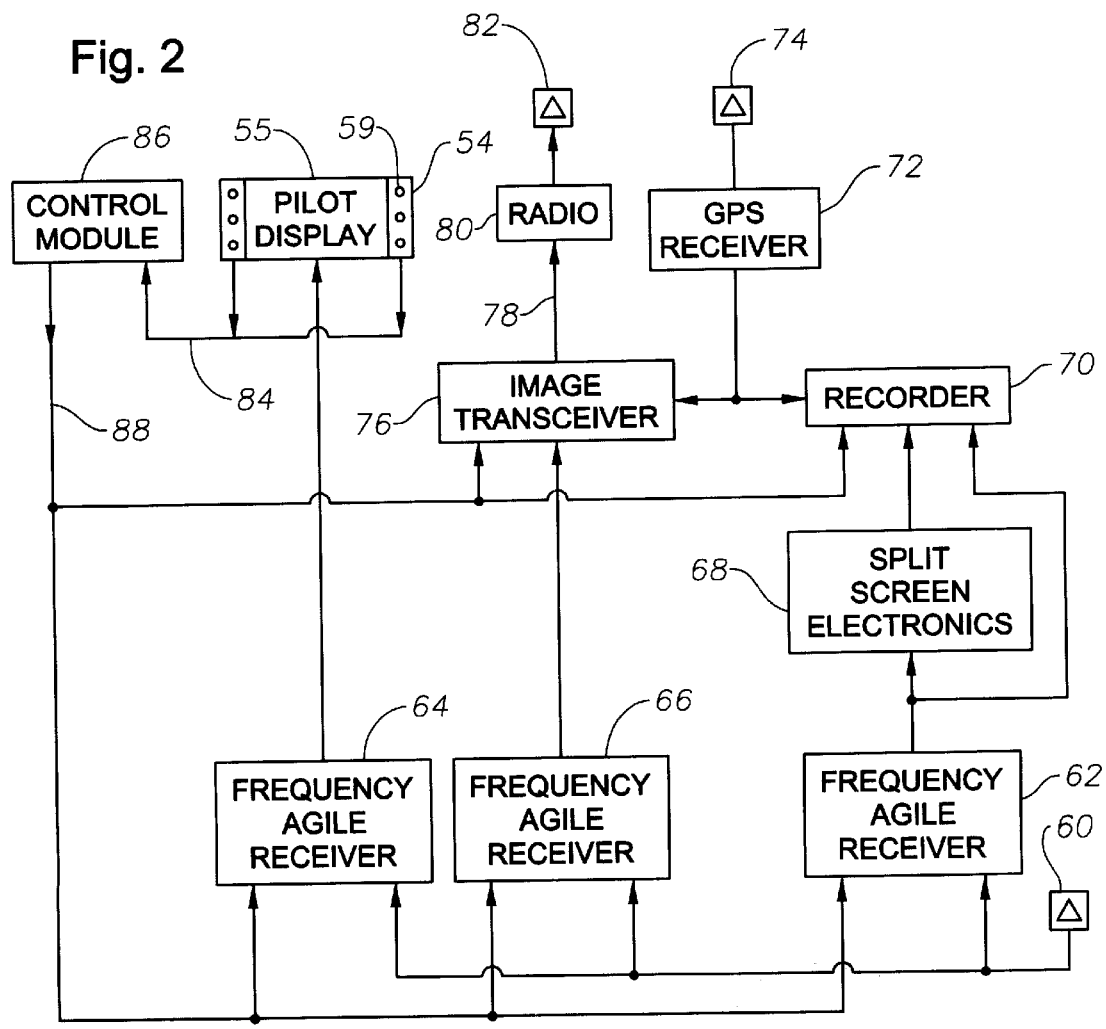
FIG. 2 is a block diagram of the control electronics for a wireless system in accordance with the subject invention, utilizing frequency agile receivers in order to reduce the number of transmitter/receiver combinations required.

An exemplary embodiment of the system is shown in FIG. 2, adapted for wireless installation using frequency agile receivers. The system shown is for a wireless installation wherein the video signal captured by each camera is transmitted via radio signals and control signals from the control panel are likewise transmitted via wireless radio.

The incoming video signal is received by the antenna 60 and input into a first frequency agile receiver 62 and a second frequency agile receiver 64 and a third frequency agile receiver 66. The second receiver 64 converts the signal and transmits it to the monitor/control panel 54 in the cockpit. The first receiver 62 transmits the signal to the split screen electronics control 68, described herein (see FIG. 12). The frequency agile receivers are selectively tuned under the control of the system to receive the specific radio frequency for receiving the video signals from the plurality of on board video cameras.

Figure 4:
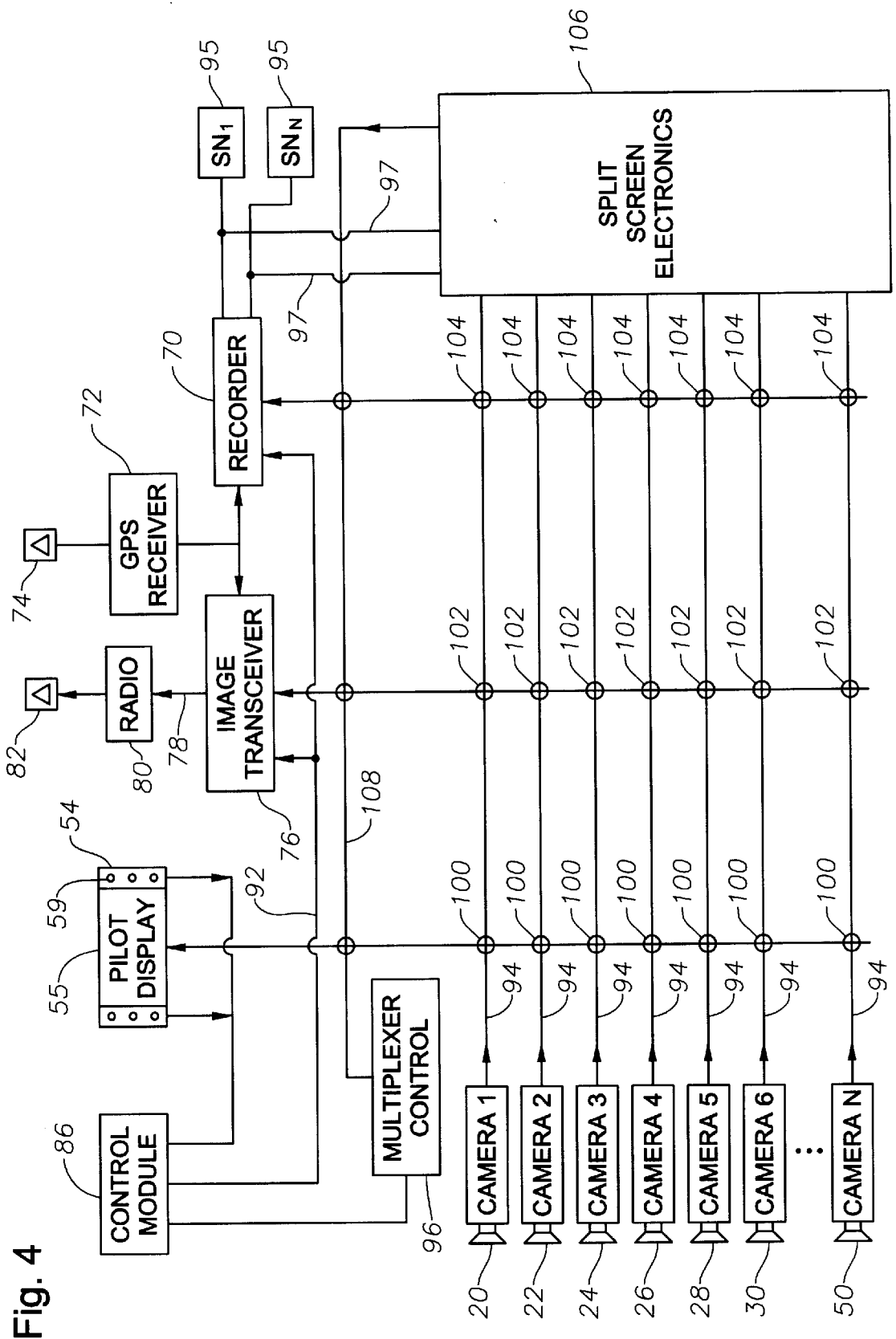
FIG. 4 is a block diagram of a multiple video imaging device system incorporating the features of the invention and a split screen monitor capability.

The output from the split screen system 68 is introduced into the flight recorder 70 for permanent recording. In the preferred embodiment, the standard on board global positioning system (GPS) includes a receiver 72 and an antenna 74. The GPS signal is also input into the flight recorder 70 and may be overlaid on the video signal in order to provide precise information of the specific time and location of the aircraft for each captured and recorded video incident. As shown in FIG. 4, the signals generated by various other components of the aircraft may also be collected for storage, transmission and monitoring utilizing the system of the subject invention, as indicated by the sensors 95. These signal may introduced directly into the recorder or may be synchronized with the video signals as indicated at 97. Such sensors 95 would include any data signal desired to be incorporated in the comprehensive data system of the invention, such as, by way of example, the output signals produces by system monitoring transducers including, for example, engine temperature, oil and hydraulic pressure and the like. The system can also include data such as the radar signal, a chronology of the flight, global positioning and the like. This permits a comprehensive history of the flight as well as ready access to all available information by both the flight crew and a ground station.

The system may also incorporate a ground link communications capability, wherein any of the video signals transmitted to antenna 60 may be introduced into an image transceiver 76 through the agile frequency receiver 66.

The frequency receiver 66 provides an input to the image transceiver 76 which is adapted for generating a radio signal at 78 for input to an on board radio transceiver 80. The radio signal is transmitted to a ground station (not shown) via antenna 82.

The frequency receiver 64 provides a video signal to the monitor 55 of the cockpit control panel 54. The flight crew has can control the selection of cameras monitored at monitor 55 and can control the transmission of images to the ground station via radio 80. This is indicated by the control signals on line 84 from the control panel 54 to the control network 86. The control network 86 sends control signal out over a control transmission line or lines 88 to control the receivers 62, 64, 66 and the recorder 70 and the image transceiver 76. The operation of the video flight recorder and the frequency receivers is not intended to be accessible by the flight crew. In addition, the antenna 82 can receive uplinked video messages from a ground station. These signals are tied to the GPS signal and are both recorded at the recorder 70 and transmitted to the flight deck monitor 55. The recorder 70 may be a standard analog recorder, or may include digital hard drive systems or a random access digital memory, or other recording scheme as desired. The random access scheme would be particularly useful for having instant access to historical data while in flight. For example, if a terrorist was found to be on board, it would be useful to play back preceding activity to monitor the past actions by the terrorist before he was identified by the flight crew or ground tracking station. This could prove useful in determining a course of corrective action. As an example, it could assist with the location of an explosive device.

The frequency receivers 62, 64 and 66, the video recorder 70, the image transceiver 76, the GPS system 72 and the radio 80 utilize known technology well known to those skilled in the arts. The antennas 60, 74 and 80 are also of standard configuration. The control panel 54 and monitor 55 are of standard design, with the control panel utilizing electrical switches to activate and deactivate the crew controllable functions. The control system 86 is a solid state controller and may include firmware or software for controlling the automated functions which are not manually controlled by the crew or the ground personnel. The specific configuration of the control system is discretionary and is within the purview of those of ordinary skill in the art.

Figure 3:
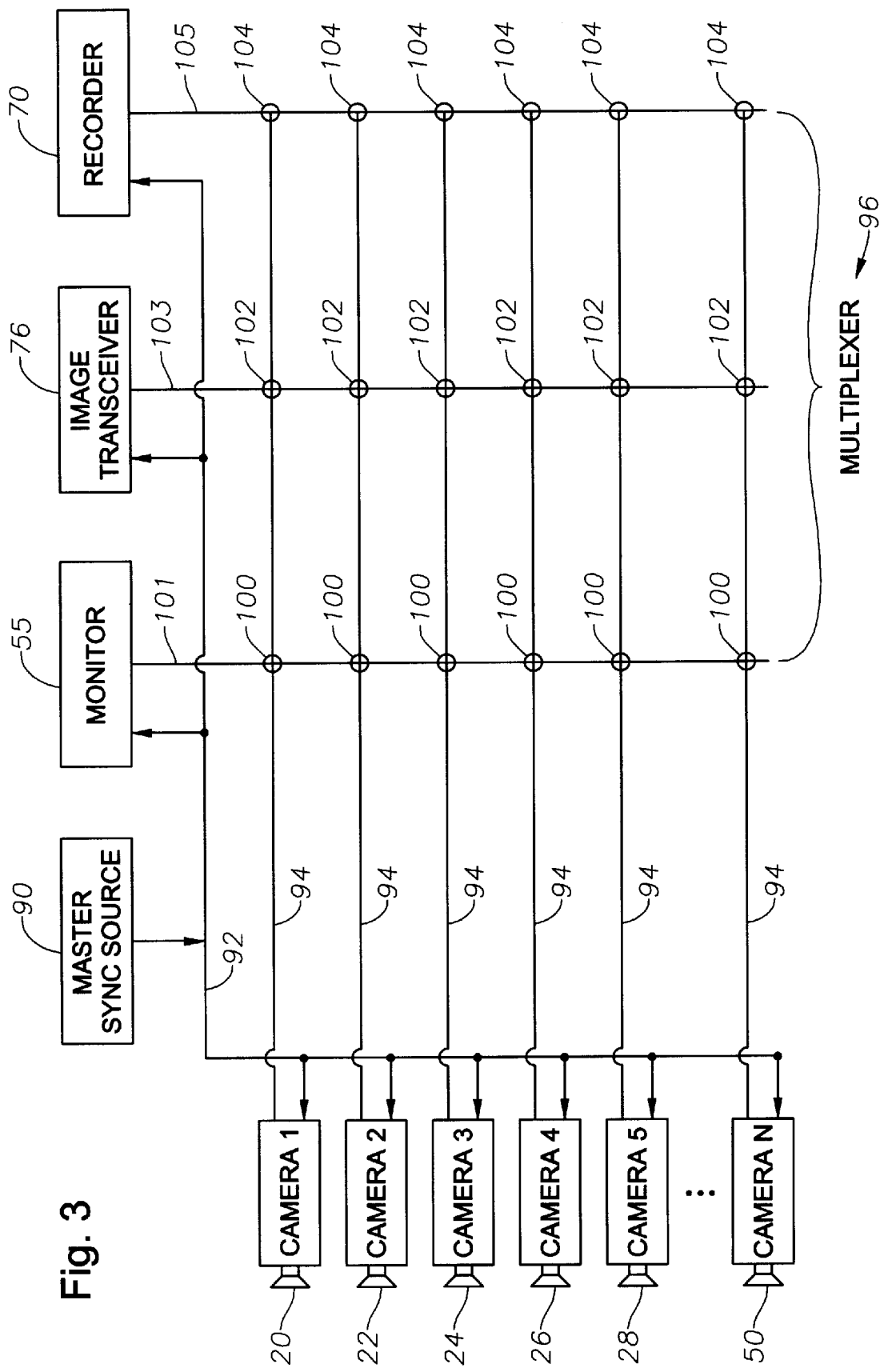
FIG. 3 is a block diagram of multiple image/data synchronization scheme in accordance with the subject invention.

The present invention contemplates the use of synchronized multiplexing to maximize the capture of video signals from a plurality of cameras while minimizing the amount of hard physical equipment to store and process such a vast amount of information. One embodiment of the synchronizing system is shown in FIG. 3. As there shown, each of the plurality of imaging devices such as cameras C1–CN, such as, by way of example, the cameras 20, 22, 24, 26, 28 . . . 50, receive a master synchronizing signal from a master synchronizer via an input line 92. This assures that the raster scanned image captured by each camera is in synchronization with every other camera on the system and permits switching between cameras at monitor 55 without loss of full screen imaging. Each of the independent images captured by the cameras is output on a dedicated output line 94 into a switching matrix 96. The matrix permits either manual selection of the image to be displayed at monitor-55 or automatic sequencing, as will be explained, with the monitor video signal being input to the monitor 55 via line 98, in communication with the plurality of video signals 94 via electronic switches 100. The video signal to the image transceiver 76 is also synchronized via the synchronizing system 90 and the specific image input to the transceiver 76 is controlled by a series of electronic switches 102. Likewise, the recorder is synchronized, with all of the video signal on the dedicated lines 94 being input into the recorder through a series of electronic switches 104. In reality, the monitor 55, image transceiver 76 and recorder 70 simply process whatever signal is present on their respective input lines 101, 103 and 105, operating in the normal, well-known manner. What makes the consolidation of equipment possible is the switching scheme utilized at the switch matrix 96 in order to capture and utilize a maximum amount of useful information in a minimum of space and with a minimum of hardware.

The simple switching scheme shown in FIG. 3 simply utilizes a sequencing system, where each of the plurality of image signs is sequentially and serially introduced into the processing stations (monitor 55, transceiver 76 and recorder 72). For example, using a thirty camera system, if each signal is displayed for one-tenth of a second, the system will make a pass of all thirty camera twice every minute. This means the longest gap between recorded information for any one camera will be less than thirty seconds. That is, the recorder will have an image on record for every camera in the twenty camera system every thirty seconds. As previously stated, the flight control panel 54 permits the flight crew to override the automatic switching sequence, permitting the ground station or the flight crew to look at any selected camera signal for any desired length of time. For example, if difficulty with the landing gear was detected, the crew could train the monitor and the transceiver on the landing control camera for as long as necessary without interfering with the recorded sequenced information.

Figure 13:
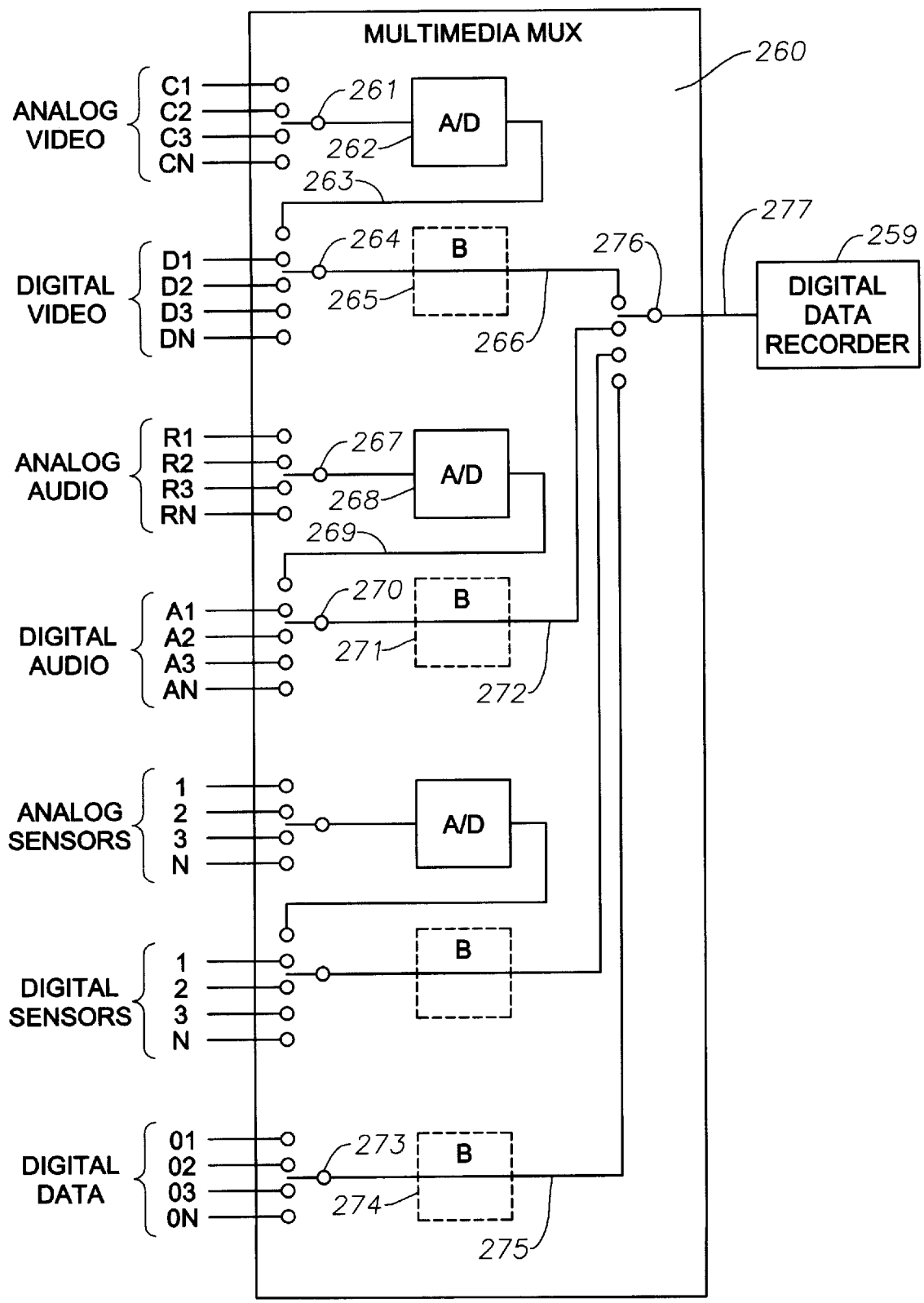
FIG. 13 is a modification of the system of the subject invention, incorporating analog sensors combined with digital to analog conversion schemes and a digital data recorder.

A modified synchronized multiplexing system incorporating split screen technology is shown in FIG. 4. Typically, the switching matrix control 96 is controlled via the master controller module 86. Each of the video signals 94 are input into a split screen network system 106, which is programmed by the control module 86 via control line 108. This permits the video signal input into the various processing stations 55, 76 and 70 to be split so that more than one image can be simultaneously displayed, transmitted or captured. For example, this would permit the crew to focus on the landing gear camera using a portion of the monitor while permitting the remaining images to scan through the normal sequence. Other split screen/sequencing schemes can also be used, as will be explained (see FIGS. 11–13).

Figure 5:
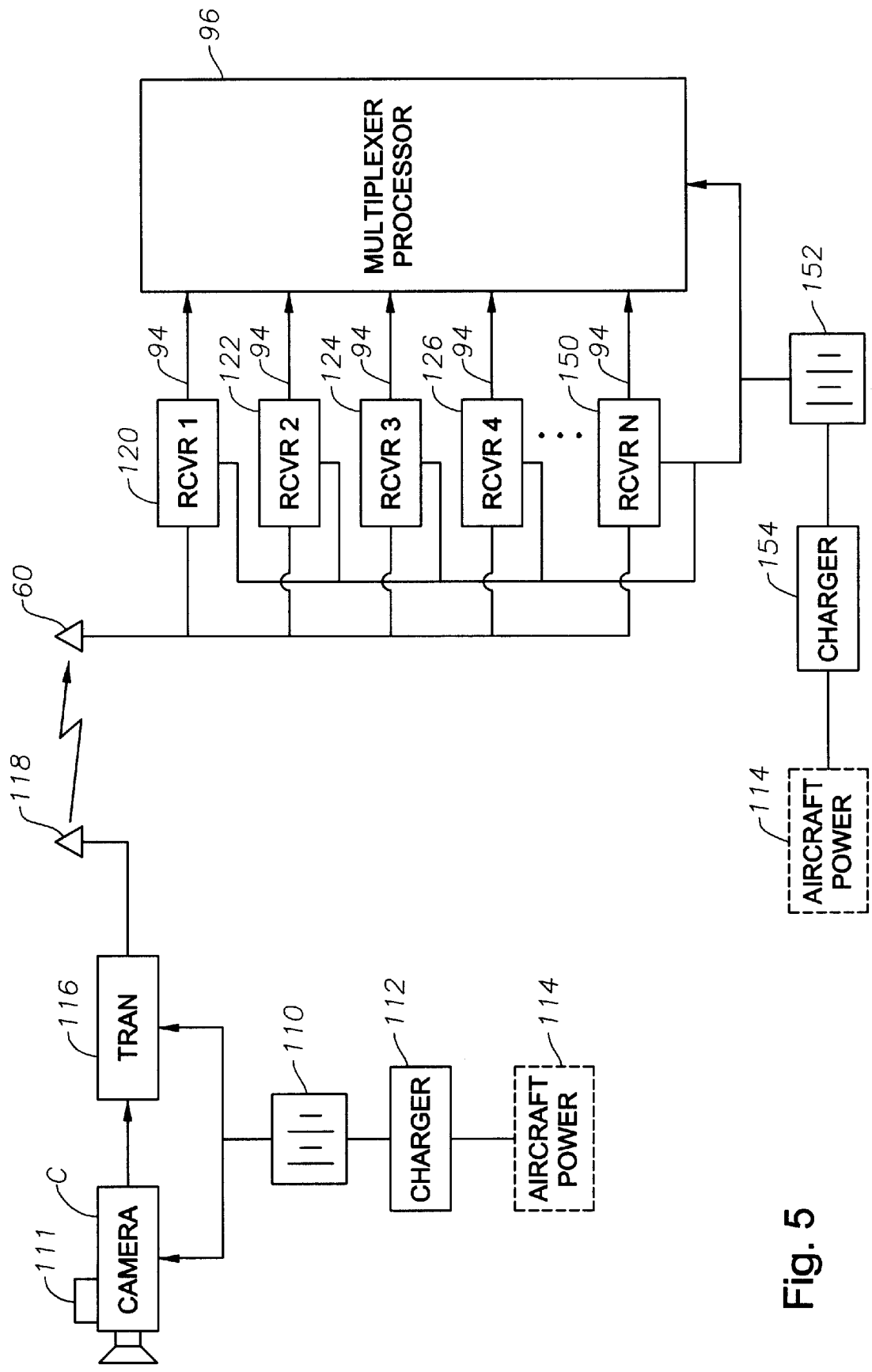
FIG. 5 is a block diagram illustrating a typical system utilizing a wireless transmission and receiving scheme in accordance with the invention.
Figure 6:
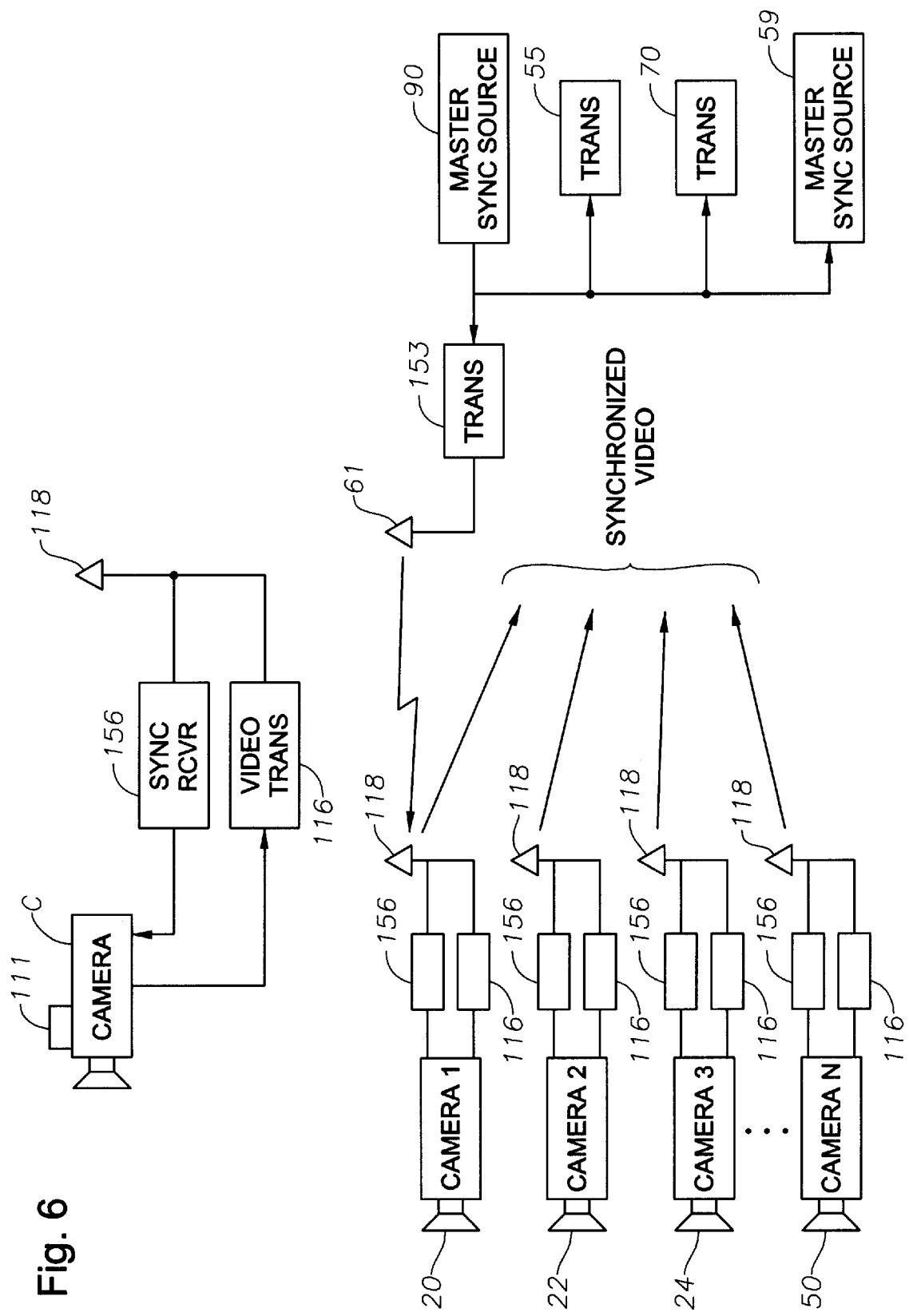
FIG. 6 is a block diagram showing a multiple sensor/video device, synchronized system configuration, in combination with wireless system.

Turning now to FIGS. 5–8, the wireless transmission system for use-on board the aircraft is shown in block form in FIG. 5. Typically, each of the various cameras C will be mounted at the desired site and will include a self-contained power supply such as the rechargeable battery 110. This provides a fully integrated system which is operational even in the event offailure or shut down of the aircraft power supply and backup systems. In the preferred embodiment, each camera unit will include an illuminating source such as, by way of example, the high intensity light source 111, which will be operational during a power failure mode, or selectively operational during certain operating modes. For example, the landing gear camera illumination system would be operational whenever the natural level of exterior light is insufficient to provide a good video image. Other systems such as infrared lens systems can also be incorporated to provide adequate image capturing techniques. The battery will rely on a charging system 112 which is hardwired to the aircraft power system 114, but will continue to operate the camera in the event of aircraft power disruption for any reason. The camera system also includes a self-contained transmitter 116 and an antenna 118 for transmitting the captured video signal via a dedicated low interference radio frequency. Each signal is received by an antenna (see FIG. 2) and deciphered by matching receivers 120,122, 124,126 . . . 150, in one-to-one correspondence with the cameras 20,22,24,26 . . . 50, to provide a unique video signal on each of the lines 94 as previously described, for providing input into the switching matrix 96 of the receiver/processing network. The receiver/processor network also include a dedicated, self contained power supply as indicated by the rechargeable battery 152 and the charging system 124, which is connected to the aircraft power system 114.

Where a synchronized system is used in a multiple camera installation, the video camera system C is modified as shown in FIG. 6. Numerous synchronizing techniques may be utilized, as will be well understood by those of ordinary skill in the art. For example, the wires may be synched, or the unsynchronized video signal may be transmitted and then resynchronized utilizing digital techniques, or as illustrated here, where the synch signal is transmitted. Specifically, each camera C will include a self-contained synchronizing signal receiver 156 in addition to the transmitter 116 and the power supply. The antenna 118 will be used for both transmitting the video signal and receiving the sync signal. As diagrammatically shown in FIG. 6, the receiver/processing system is modified to include a master synchronizing signal source 90, see FIG. 3 and a transmitter 158 coupled to the antenna 61.

Figure 7:
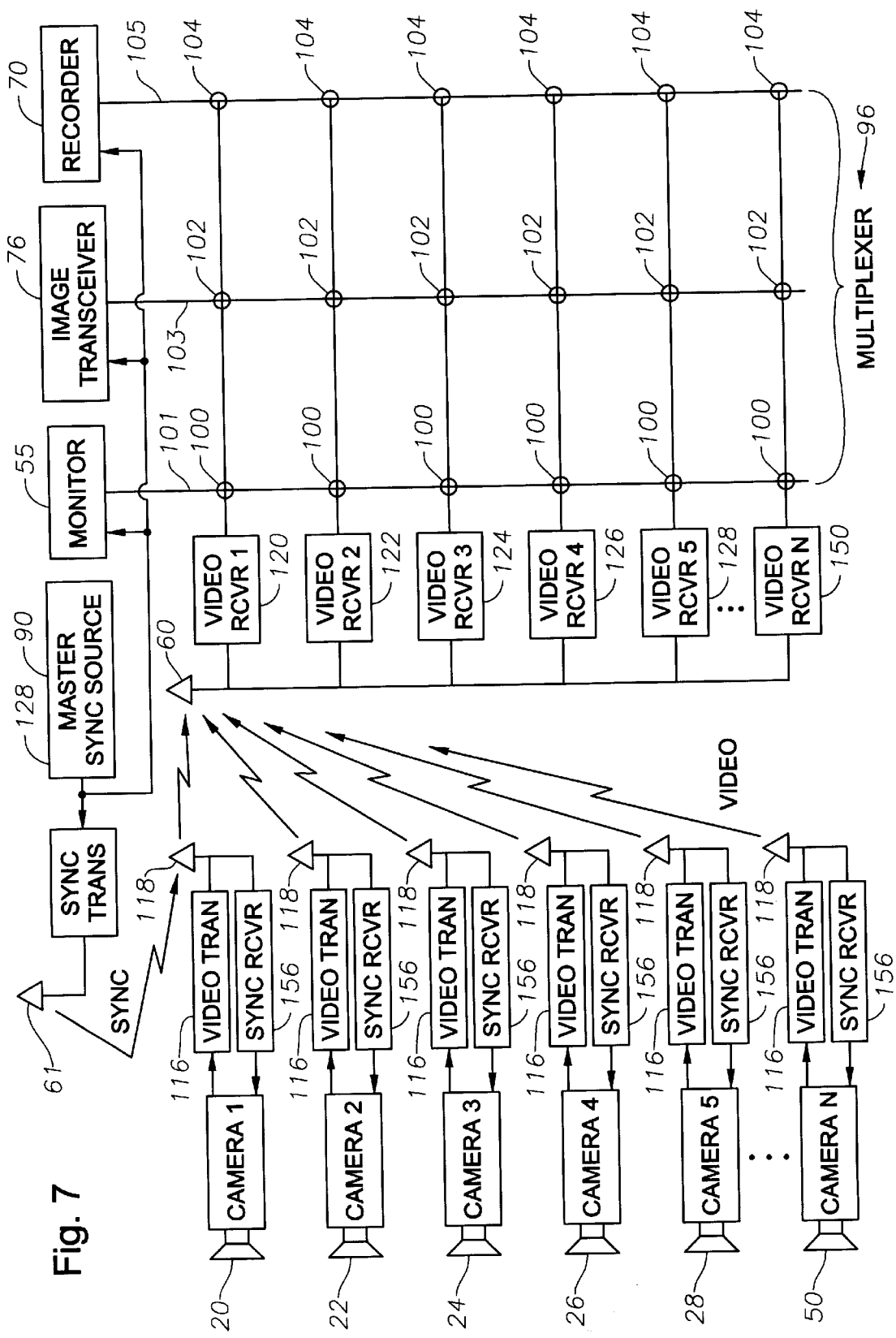
FIG. 7 is a an expansion of the block diagram of FIG. 6, showing the multiplexing switching scheme and the receivers.

As more clearly shown in the expanded diagram of FIG. 7, the system incorporates a multi-camera wireless, synchronized system, with the receiver/processing system expanded to show the switching matrix 96 in combination with the monitor 55, the image transceiver 76 and the recorder 70, see also FIGS. 3 and 4 which is a hardwired version of the same system.

Figure 8:
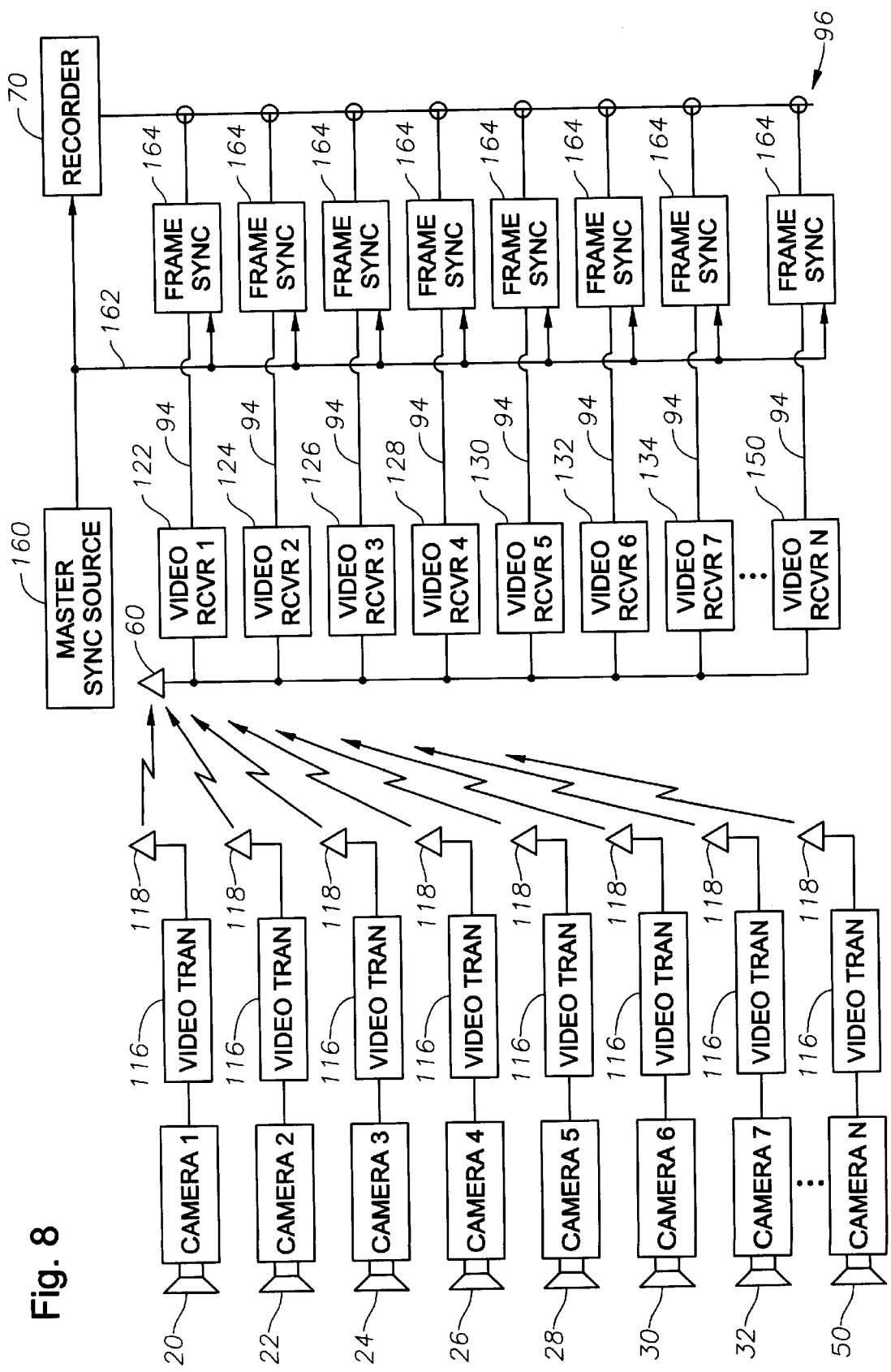
FIG. 8 is a block diagram for a second alternative wireless system incorporating multiplexed digital frame synchronization.

FIG. 8 illustrates a system which is a modification of the system of FIGS. 6 and 7, adapted for frame-by-frame synchronization, where selected still images are created and processed on a synchronized basis for each of the plurality of cameras 20, 22, 24, 26, 28, 30, 32, 34 . . . 50. In this version, the cameras are not synchronized and each raw video signal is transmitted to antenna 60, where it is deciphered and output at the respective video receiver 120,122, 124,126,128,130,132, 134 . . . 150. In this embodiment, the master synchronizing source generates a frame-by-frame synchronization of the raw signal by sending a frame synchronizing signal via output line 162 to a frame synchronizer 164 and to the recorder 70. This permits the capture of sequentially synchronized frames of each camera on a serial basis. This is a simpler system in that it does not require the synchronizing network at each camera. However, it also does not permit storage of all of the raw data on the recorder since only sequential frames are captured.

Figure 9:
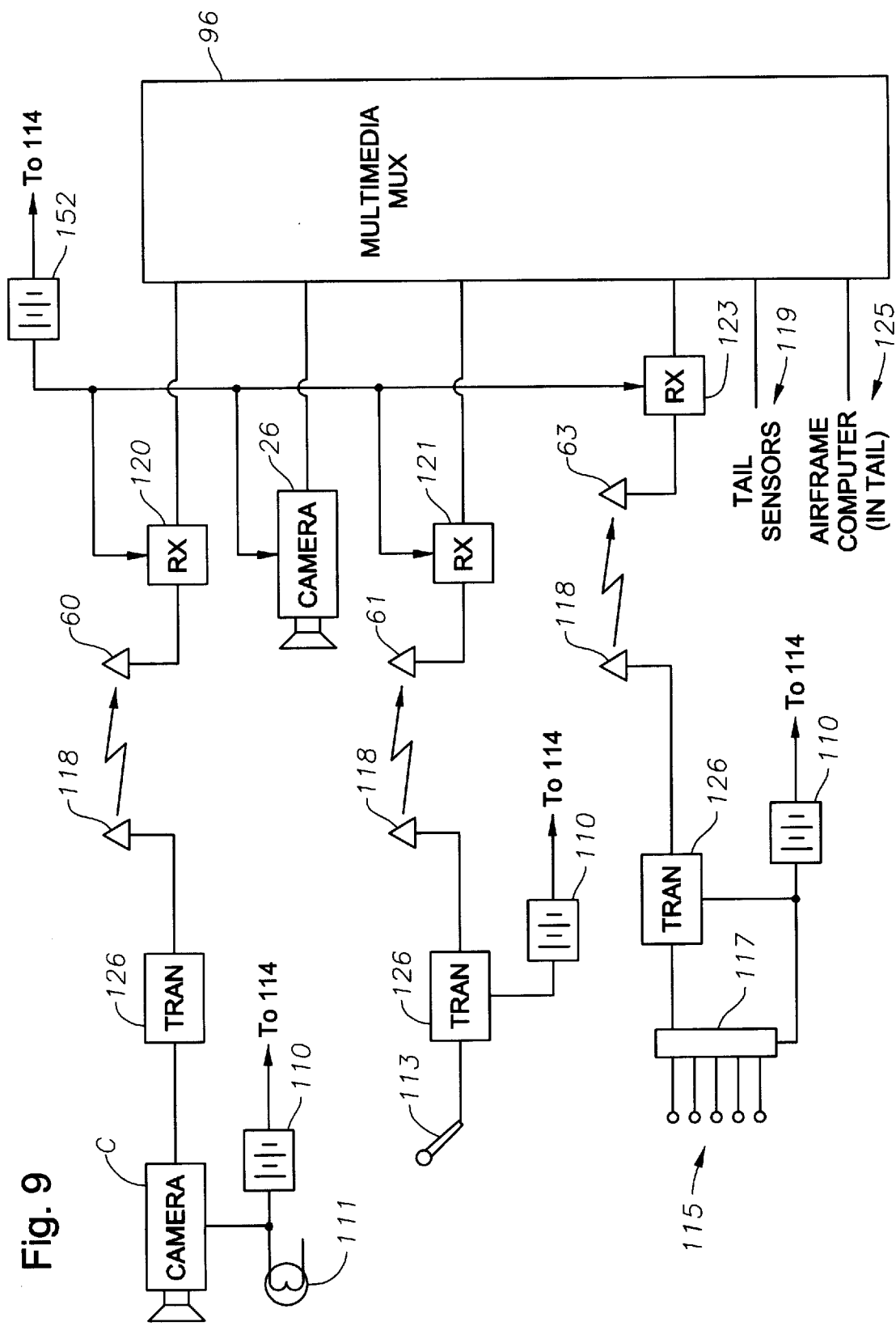
FIG. 9 is a block diagram system illustrating a combination of both hard wired and wireless sensor devices, wherein remote sensors rely on wireless transmission and sensors in close proximity to the processing system may be hard wired.

FIG. 9 illustrates a modification of the embodiment of the systems of FIGS. 6–8, incorporating a hybrid wired/wireless combination with a plurality of sensors for providing multi-media data collection capability. A typical image sensor such as a video camera C is positioned at a specific location to be visually monitored. As previously described, any desired number of such devices may be incorporated in the system. For a wireless connection, the camera system will include a transmitter 126 and an antenna 118. In the preferred embodiment, it is desirable that the image sensor system also be fully integrated, including a self-contained power supply 110 which may be rechargeable utilizing aircraft power at 114, as previously described. Where appropriate, the image sensor system will include a self contained illumination source 111. As in the earlier described embodiments, the image signal picked up by the camera C will be transmitted to a receiver through the antenna 60, and will be input into the multiplexer processor system 96. In this embodiment, hard wired sensors such as the image sensor C= may be incorporated in combination with the wireless sensor systems. For example, the tail section camera 26(See FIG. 1) may be in such close proximity to the processor 96 that a wireless transmission is unnecessary. In this case, the camera C= can be wired directly with the processing system.

Additional multi-media sensors may be incorporated in the system, as well, and may be wireless or hard wired as appropriate. For example, one or more audio sensors such as a cockpit microphone 113 with a dedicated transmitter 126 and antenna 118 may transmit audio signals to the dedicated antenna 63 and receiver 123 for input into the multiplexer processor 96. The wireless audio sensor system of microphone 113 is also self-contained and includes an independent power supply 110.

Various function sensors, such as, by way of example, an entire array of engine sensors 115 may also be incorporated in the multi-media system of the subject invention. Where a plurality of such sensors are utilized, it is desirable to provide a local multiplexer system 117 to minimized the amount of duplicative hardware. In the example shown, all of the engine telemetry sensors in array 115 require only a single transmitter 126 and antenna 118. In the wireless system shown, the engine sensor array is also fully self-contained with an independent power supply 110. The output signal of the multiplexer 117 is transmitted by transmitter 126 through antenna 118 to dedicated antenna 63 and transmitter 123, and input into the multiplexer/processor 96.

Where appropriate, sensors which are in close proximity to the multiplexer/processor, such as the tail sensor system 119 and the airframe computer 125, may be hard wired directly to the multiplexer/processor 96. It is desirable that the receiver/multiplexer/processor system as well as any hard wired sensors also be provided with an independent power supply system 110, in the event of malfunction of the aircraft power supply.

FIG. 10 is an expanded diagram of the engine sensor array of FIG. 9, using wireless telemetry. In the illustrated array, an engine oil pressure sensor 113A will be mounted on each aircraft engine for monitoring the oil pressure. The pressure signal will be introduced into the local multiplexing network 117. Likewise, the oil pressure of each engine is monitored by a pressure sensor 113B and introduced into the multiplexer 117. Each engine tachometer signal generated by tachometer 113C is similarly input to the multiplexer, as is the strain gauge or sensor signal 113D and the fuel pressure sensor 113E. Any of a variety of multiplexing schemes may be utilized. In the preferred embodiment, it is presumed that a serial, cyclical sequence will be used to produce a single output signal from the multiplexer 117 which is input into an encoder 127 in the will known manner from. which it is introduced into the transmitter 126 for wireless transmission as previously described. Each engine on the aircraft would have an independent engine sensor array system associated with it. Of course, the local multiplexer is optional but is desirable due to the resulting reduction in duplicative hardware. The wireless system includes a self-contained, rechargeable power supply for the entire system, as indicated by the battery 110, and the battery charger and control system 112. Typically, the system will rely on aircraft power, as indicated at 114, for charging the system, with the battery back-up capable of operating in the event of power failure.

A typical image sensor system, utilizing an analog video camera C, for use with the system of FIG. 9 is shown if FIG. 11. In the wireless telemetry system shown, a dedicated transmitter 126 and antenna 118 are utilized as previously described, and the image sensor system is self contained, with an integral power supply as indicated by the battery 111 and the charger/control 112. The camera output signal is introduced into the modulator 127 for processing, and the output of the modulator is input into the transmitter. An optional receiver 116 may be provided, as shown in phantom, for providing a synchronizing signal for synchronizing the video signal with other image sensor signals, as previously described.

A further expansion of the system of the present invention is diagrammatically illustrated in FIG. 12, incorporating a multi-media multiplexing system and a plurality of sensor arrays providing comprehensive data relating to the operation of the aircraft. As there shown, a variety of image sensor devices may be incorporating, including the video cameras C1, C2, C3 . . . Cn, an advanced imaging device such as the FLIR camera 220, the on board radar detector 222 and the like. All of these produce a visual signal. In addition, various audio signals may be incorporated utilizing a variety of audio sensor devices, such as a cockpit voice detector 113, on board radios 224, 226 and the aircraft public address system 228. All of these produce an audio signal. The operational data signals are also incorporated, as previously described, and may include the GPS sensor 72, other navigational sensors 230, the various engine sensors 113 and the airframe computer output 25. Thus, the system of the subject invention will accommodate a multiple input, multi-media array incorporating video, audio and digital data signals into a comprehensive data base for providing detailed information relating to the aircraft performance at any time during the flight path.

Each of the sensor device signal is introduced into a multi-media multiplexer network 232., which includes a dedicated image multiplexer subsystem 234, a dedicated audio multiplexer subsystem 236 and a digital data multiplexer subsystem 238, all of which produce distinctive multiplexed signals which are introduced into a master multiplexer subsystem 240 for producing a combined, comprehensive output signal on each of lines 242, 244 and 246. The distribution and processing of the comprehensive output signal is provided by a master controller 241. The visual and digital data is available at the cockpit display monitor 54 located on the flight crew control panel 55. All of the data, including all video, audio and digital data will be recorded on the A black box data recorder system 52. The combined, comprehensive output signal on line 246 may be downlinked to the ground tracking station (not shown) via the aircraft radio system 80 and the antenna 82. As indicated by line 248, the flight crew has control over certain operations and may select for example, the data to be displayed on monitor 54 or to be downlinked via the radio 80. Likewise, the ground crew may selectively uplink data to the aircraft and may selectively downlink any of the available data and indicated by the uplink control line 250 and the downlink control line 252. The recorders are generally controlled by a pre-programmed routine introduced into the recorder system 52 from the controller 241 via line 254. The various recording techniques and schemes utilized with the preferred embodiments of the invention are shown and described herein, see particularly FIGS. 15–18.

As previously stated, any of a variety of recording devices and systems may be utilized. In addition to the well-known and highly utilized analog recording systems, it is desirable to utilize a digital data recorder system in many instances to permit global searching and downloading capability. The digital recorder system shown in FIG. 13 permits the use of both digital and analog sensor devices in combination with a digital data recorder system. As there shown, the digital recorder 259, such as a digital disk recorder or the like receives a combined, comprehensive data signal on line 271 from the master multiplexing network 260. In the illustrated embodiment, the analog signal from each of a plurality of analog video devices such as cameras C1, C2, C3 . . . Cn are input into the multiplexer 260 and a combined multiplexed signal is generated at the local multiplexer subsystem 261. This multiplexed analog signal is then converted to a digital signal on line 263 at the analog to digital converter 262. A plurality of digital image signals from each of the digital sensor/devices D1, D2, D3 . . . Dn. such as the radar and FLIR camera signals are also introduced into the master multiplexing system 260, where a local multiplexer 264 produces a combined digital image signal on line 266 comprising the multiplexed, converted analog image signal and the various digital image signals. Where appropriate, a signal processor 265 (as shown in phantom) may be incorporated in the system.

The analog audio and digital audio signals are combined and processed in a similar manner. For example, the analog audio sensor signals R1, R2, R3 . . . Rn, such as the aircraft analog radios, are introduced into a local multiplexer 267 to produce a combined signal which is converted by the analog to digital converter 268 for producing a converted, multiplexed signal on line 269. The signal is combined with the various digital audio signals present on lines A1, A2, A3 . . . An by the local multiplexer 270 for producing a combined digital audio signal on line 272, which may be processed as necessary by the processor 270 (shown in phantom). The digital data signals on lines O1, O2, O3 . . . On, such as the engine sensor array signals from each of the engines and the airframe computer, are introduced into a local multiplexer 273 for producing a combined digital data signal on line 275 which may be processed as necessary by processor 274 (shown in phantom).

The combined digital image signal 266, combined digital audio signal 272 and the combined digital data signal 275 are then introduced into the master multiplexer system network 276 for producing a combined multi-media digital output signal on line 277 for input into the digital data recording system 259.

Figure 14:
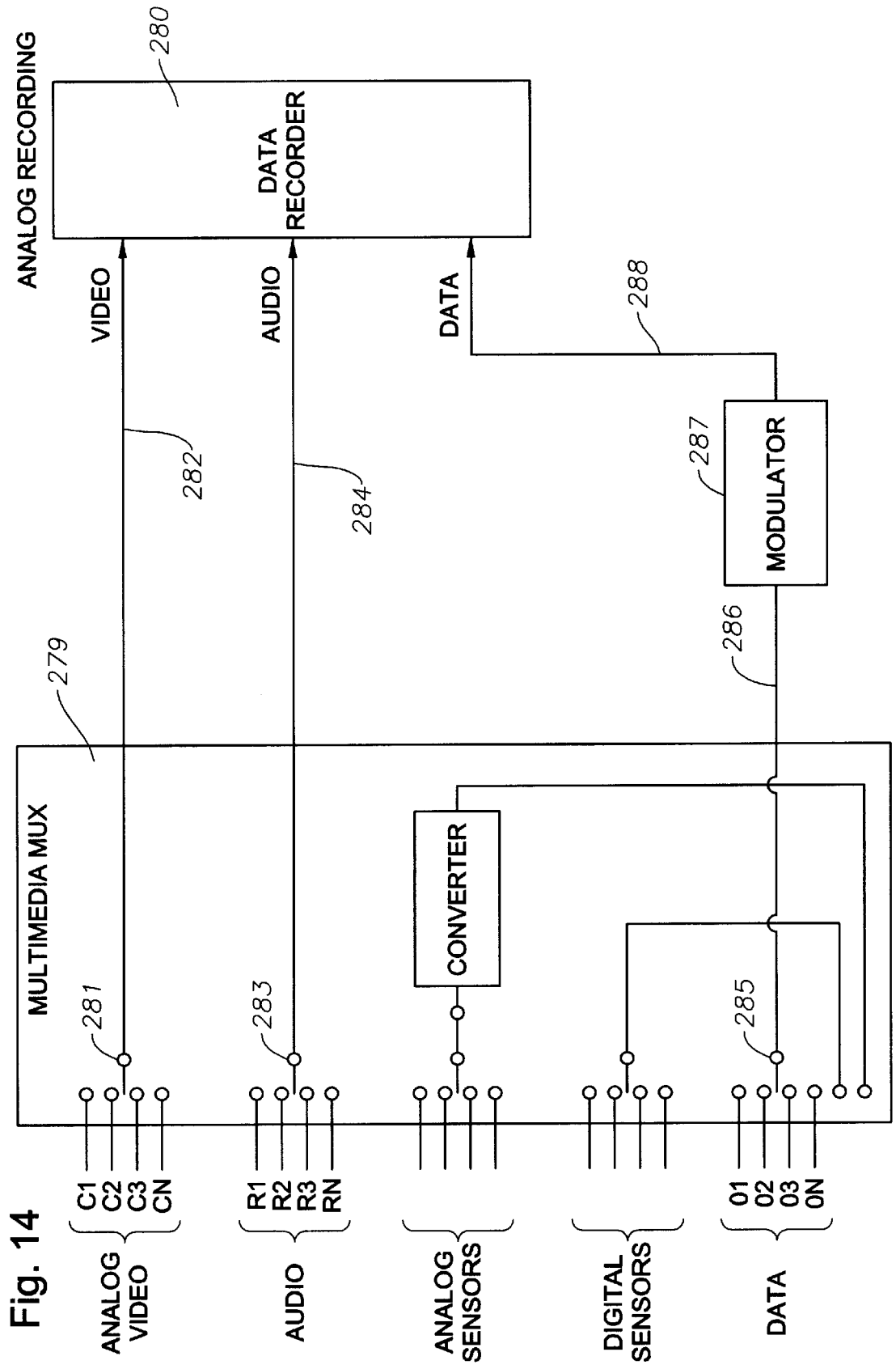
FIG. 14 is an illustration demonstrating the multimedia capability of the system of the subject invention.

FIG. 14 illustrates an alternative, multichannel analog recording system wherein various analog (and/or converted digital signals) may recorded on an array of analog recorders and indicated by the recorder system 280. As previously described, each of the analog image signals C1, C2, C3 . . . Cn are introduced into a multiplexer system 279, where a local or dedicated subsystem multiplexer 281 produces a combined image signal on line 282. Likewise, each of the analog audio signals on lines R1, R2, R3 . . . Rn are combined by a local multiplexer 283 into a combined audio signal on line 284. The various data signals O1, O2, O3 . . . On are similarly combined by local multiplexer 285 into a combined data signal 286. In the embodiment shown, the data signal is in digital format and is modulated at 287 to produce an analog data signal on line 288. These signal may be recorder in a single channel format by again utilizing a multiplexing technique (not shown). It is preferred, however, to utilize a multi-channel recording scheme for analog data due to the slow speed of recording and retrieval associated with known analog systems. In the illustrated embodiment the analog recorder system is designated as the recorder 280.

FIGS. 15–18 depict exemplary split screen configurations which may be used with the synchronized, multiple camera system of the invention and are particularly useful for multi-channel analog recording systems such as that shown in FIG. 14. Assuming the ten camera system shown in FIG. 15, the screen area may be split into three sections. As previously stated, the output signal for each camera is on line 94 output from the respective video receiver 120–138. For recording purposes, any selected one of the ten camera images is recorded on recorder channel 1 as indicated by the switching circuit 196 and recorder 1, 180. In addition, the first five camera images in sequence, as output from receivers 120, 122, 124, 126 and 128, respectively, are simultaneously introduced into the split screen system A 182, and recorded simultaneously in split screen format at recorder 2, 184, as indicated at line 186. Likewise, the second sequence of five camera images, as output from receivers 130, 132, 134, 136 and 138, respectively, are simultaneously introduced into the split screen system B 188, and recorded simultaneously in split screen format at recorder 3, 190, as indicated at line 192. This permits full recording of all ten cameras on two channels 2 and 3 and a full screen image recording of any selected camera on channel 1. Typically, channel 1 will sequence through each of the ten camera images on a cyclical basis. For example, a six second interval may be used, permitting the sequence to recycle every minute for a ten camera system. This system permits continuous imaging of all cameras on a reduced scale and cyclical, timed imaging of each camera with a full screen image, providing good full image capture with only a three channel recording system. The global positioning signal from the GPS receiver is introduced into each recorder channel via line 194 and is overlaid on the video image.

Figure 15:
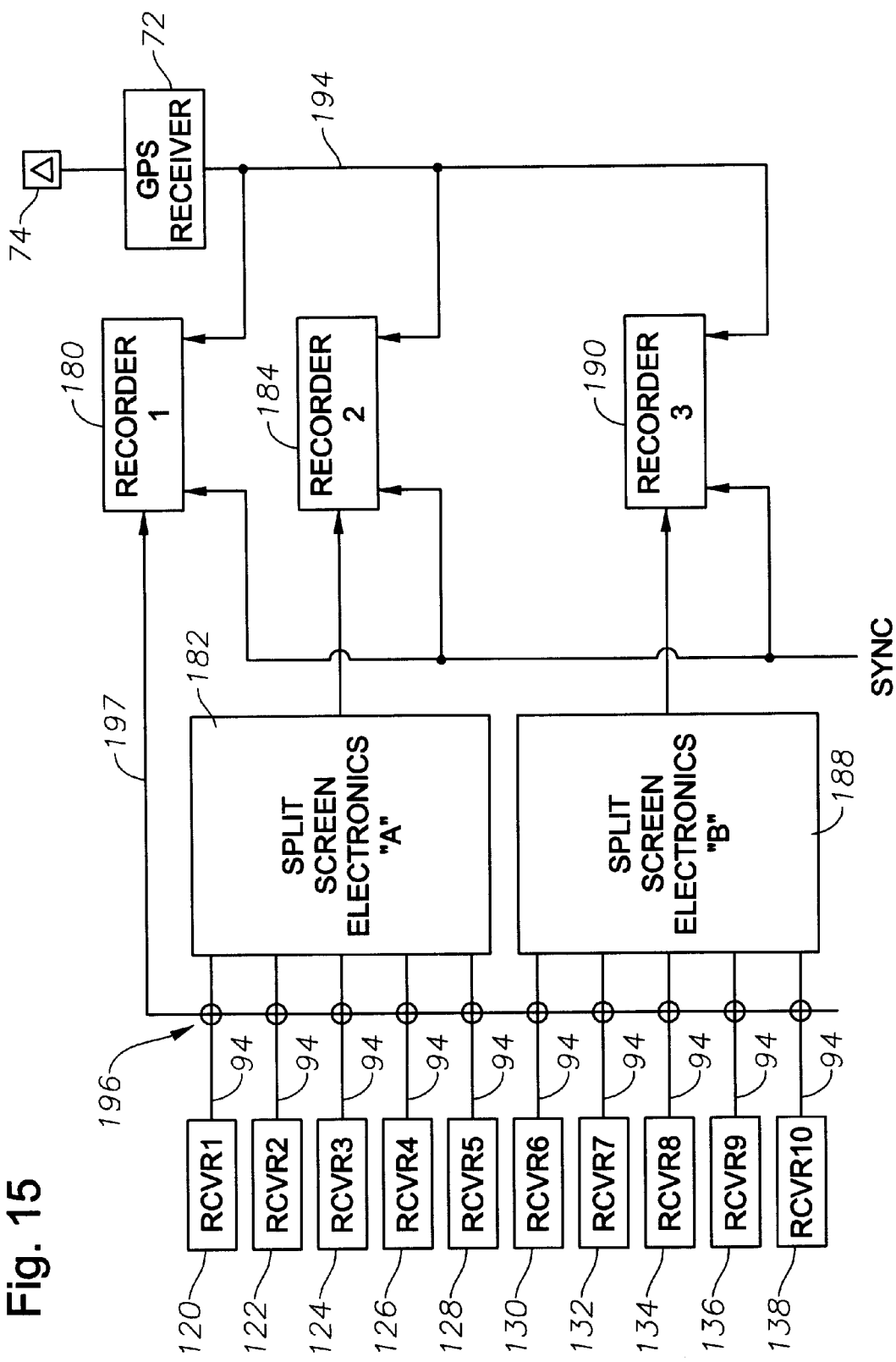
FIG. 15 is a block diagram for a multiple sensor/device, multiple channel recorder configuration.

The timing sequence for the three channel system is shown in FIG. 16. Channel 1 is shown in line 201, channel 2 is shown in line 202 and channel 3 is shown in line 203. Each block 204 in each line represents a discrete time interval. Where the ten camera system of FIG. 15 is utilized, channel 1 sequences serially through the ten camera images while channel 2 simultaneously records cameras one through five in a first split screen format and channel 3 simultaneously records cameras six through ten in a second split screen format.

The split screen format utilizing the full screen signal on line 197 and the split screen networks 182 and 188 can be used to display real time images on the single screen monitor 55 (not shown, see FIG. 1). For example, the first camera may be displayed as a full screen image for six seconds, followed by split screen A for six seconds, followed by the second camera full screen image for six seconds, followed by split screen B for six seconds, followed by the third camera full screen for six seconds, followed by split screen A for six seconds, and so on until the cycle repeats. In this example the cycle would repeat every two minutes with all images being viewed in split screen format for six out of every eighteen seconds. This format would also permit single channel recording in lieu of the three channel system of FIG. 15, but would have space gaps in the captured images due to cycling time.

A sequenced single channel recorder and monitor time line utilizing the single channel, single screen format is shown in FIG. 17, as time line 301. For systems where all of the camera images can be captured on a single split screen the sequence is: Camera one, split screen, camera two, split screen, camera three, split screen, and so on.

Where the number of cameras, for example twenty four cameras, requires multiple split screens, the single channel sequence of FIG. 18 may be used, as demonstrated by time line 401. Each block represents a discrete time interval, wherein camera one is captured in block 402, followed by split A in block 403, split B in block 404, camera two in block 405, and so on. Other formats could also be used, for example: Full camera one, split A, full camera two, split B, full camera three, split A, full camera four, split B. full camera 5, and so on.

Figure 19:
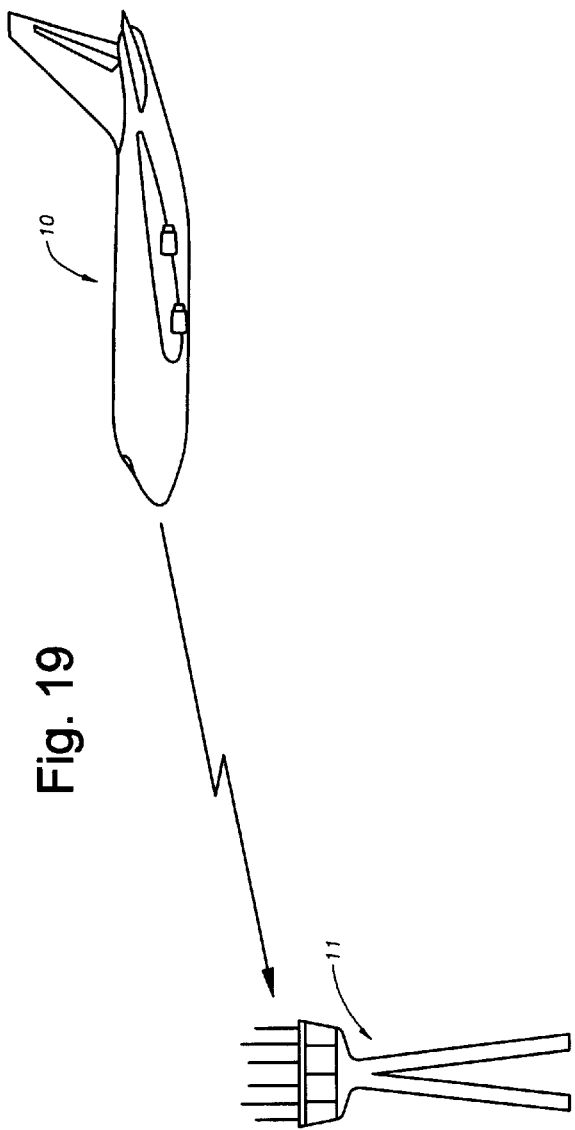
FIG. 19 shows the uplinking and downlinking system between the ground station and the airborne aircraft.

The ground link capability is diagrammatically illustrated in FIG. 19. Basically, any video signal may be sent or downlinked from the aircraft 10 to a ground station 11 using the transmitting/receiving antenna 82, as shown in FIG. 2. The signal may be selected and sent by the crew from the cockpit control panel 54 (see FIGS. 2 and 20), or may be activated directly from the ground station control panel 554 (see FIG. 21). In addition, selective video information may be uplinked via the same system with the uplinked signal being transmitted to antenna 82 and input into the system through the transceiver 76.

Figure 20:
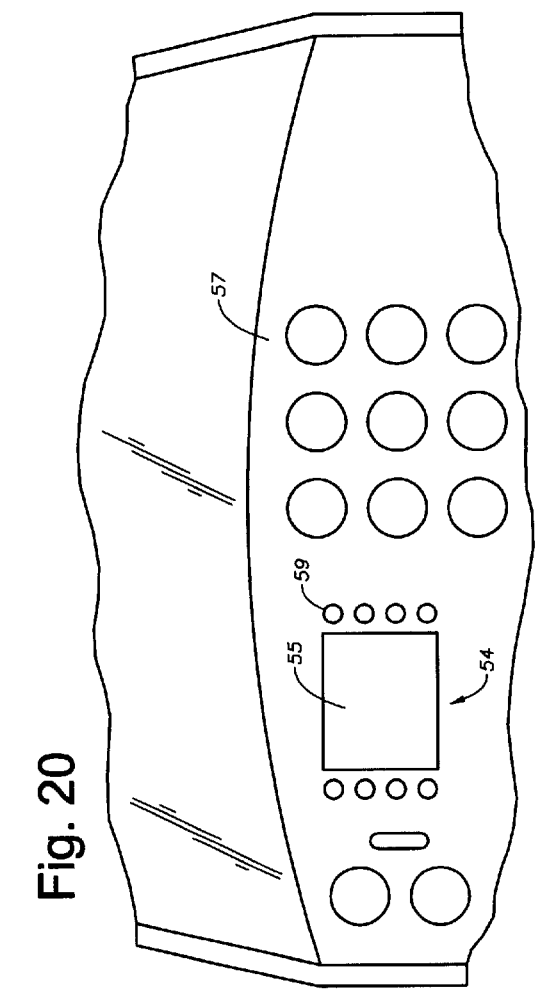
FIG. 20 is an illustration of a flight deck monitor and control panel.

The cockpit or flight deck control panel 54 is shown in FIG. 20 and is designed to be mounted directly on the control panel 57 of the aircraft, with an integrated monitor 55. The control switches 59 permit the crew to access the various images or the sequencing format, and to selectively transmit and receive images between the ground station and the aircraft.

Figure 21:
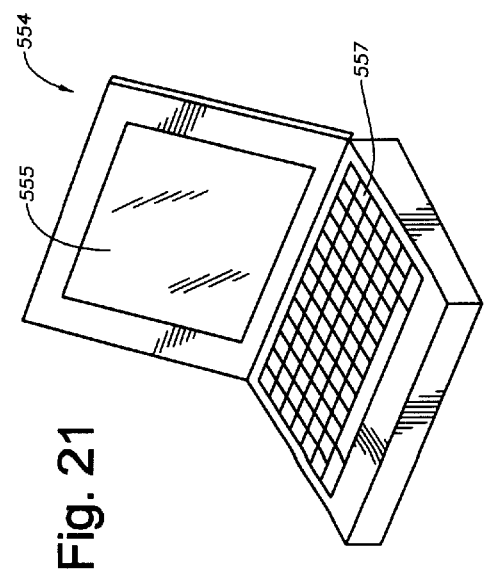
FIG. 21 is an illustration of a ground station monitor and control panel.

The ground station control panel 554 is shown in FIG. 21 and includes an integral monitor 555. The keyboard 557 provides control functions for communication with the aircraft via the uplink/downlink system shown in FIGS. 2 and 14.

The video recorders, synchronizing networks and multiplexing and split screen hardware are well known and their adaptation will be readily apparent to those of ordinary skill in the art. Any suitable video recording format can be used, for example, an analog video tape recorder, a digitizer and hard drive/optical drive configuration, or a digitizer, compressor, hard drive/optical drive configuration. Digital cameras could be incorporated in lieu of the standard analog type cameras currently in use in most applications. As digital technology becomes more readily available and more cost effective, it is contemplated that most of the imaging, monitoring and-recording equipment will be of a digital format because of the increased reliability and the minimized space requirements. Of course, it should also be understood that the monitoring, transmitting and storage capabilities of the invention are also well suited for capturing any video or visual image generated by the on board avionics of the aircraft. For example, the subject invention will accommodate the recording and transmission of radar imaging as displayed on a monitor in the cockpit. This will provide an accurate record of the radar image at the time of a catastrophic occurrence, and/or will permit downlinking of the on board radar signal to the ground crew. The system of the present invention greatly increases the information available to the flight crew during flight, enhances the historical log of the flight as recorded in the on board black box recorders, and gives the ground tracking crew access to real time information at any time during the flight of the aircraft.

The multi-media safety and surveillance system of the subject invention provides an enhanced in flight safety scheme giving instantaneous and live image access to critical components and areas of an aircraft, providing the flight crew with additional information while the aircraft is airborne. In addition, the permanent tape record will prove invaluable for investigating the causes of an in flight catastrophe or malfunction. The system is specifically designed for new commercial aircraft but is equally well-suited for retrofit applications and for other safety applications as well. While certain features and embodiments of the invention have been described in detail herein, it will be readily understood that the invention encompasses all modifications and enhancements within the scope and spirit of the following claims.

What is claimed is:

1. A multi-media data collection, transmission, storage and playback system for reconstructing in flight events on an aircraft having on board time, altitude and geographic position monitors capable of sending a logging signal, the system comprising:

a. a plurality of sensors each adapted for monitoring a selected condition aboard the aircraft, each sensor adapted for generating a unique data signal representing the specific condition to be monitored;

b. a collector adapted for collecting the plurality of data signals from the plurality of sensors and tracking the plurality of data signals with the logging signal and generating therefrom a combined signal incorporating each of the plurality of signals into a combined output signal; and c. a processing system for receiving and processing the combined output signal, the processing system adapted for preserving critical elements in the combined output signal specifically indicating a change in condition at any of the plurality of sensors;

d. a recording and playback system for recording the time, the altitude and geographic location of the aircraft and change in condition of each of the plurality of sensors, whereby changes in condition of the sensors can be later recalled to determine the time, altitude and geographic position of the aircraft when an event occurred, as well as the time and type of event depending on the change in condition of the plurality of sensors.

2. The system of claim 1, the plurality of sensors further comprising:

a. at least one image sensor device for generating an image signal;

b. at least one audio sensor device for generating an audio signal; and c. at least one data sensor device for generating a data signal.

3. The system of claim 2, the collector further comprising a multiplexer network for combining the image signal, the audio signal and the data signal into said combined output signal.

4. The system of claim 1, wherein said collector comprises a multiplexer for accepting all of the plurality of data signals and for generating therefrom a combined multiplex signal preserving the discrete identity of each of the plurality of data signals.

5. The system of claim 3, wherein said recording and playback system stores the combined output signal in a multiple channel, compressed format.

6. The system of claim 1, wherein the recorder is a single channel, analog recorder.

7. The system of claim 1, wherein the recorder is a digital random access memory device.

8. The system of claim 1, wherein said recorder is a multi-channel recorder and wherein one channel is adapted for serially recording a segmented portion of video signal in a timed, sequential, cyclical configuration, and wherein one channel is adapted for recording a plurality of the channels simultaneously in a split screen configuration.

9. The system of claim 1, the collector further includes a multiplexing system adapted for accepting a plurality of parallel data signals simultaneously and for generating therefrom a single, combination output signal.

10. The system of claim 9, wherein said multiplexing system is adapted for generating a combination output signal including a component comprising a plurality of the data signals in a split screen configuration wherein all or a selected portion of the plurality of data signals are simultaneously available.

11. The system of claim 10, wherein said single combination output signal further includes a plurality of subsets of the plurality of data signals produced in a serial, time interval repeat sequence.

12. The system of claim 11, wherein said combination output signal includes a plurality of the data signals combined in a serial, time interval repeat sequence.

13. The system of claim 11, wherein said combination output signal includes both a component comprising a plurality of the data signals in a split screen configuration wherein all of the plurality of data signals are simultaneously available and a component comprising a plurality of the data signals combined in a serial, time interval repeat sequence.

14. The system of claim 1, wherein the recording and playback system comprises a flight recorder positioned in the tail section of the fuselage.

15. The system of claim 1, further comprising:

a ground based monitoring unit;

a. a transmitter associated with the system and adapted for transmitting the combined output signal to the ground based monitoring unit;

b. a recording and playback system associated with the ground based monitoring unit for recording the combined output signal.

* * * * *